(12) United States Patent
Chong

(10) Patent No.: US 10,206,103 B2
(45) Date of Patent: *Feb. 12, 2019

(54) METHOD AND SYSTEM TO PROVIDE SECURE EXCHANGE OF DATA BETWEEN MOBILE PHONE AND COMPUTER SYSTEM

(71) Applicant: Future Dial, Inc., Sunnyvale, CA (US)

(72) Inventor: Benedict Chong, San Jose, CA (US)

(73) Assignee: FUTURE DIAL, INC., Sunnyvale, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/230,301

(22) Filed: Aug. 5, 2016

(65) Prior Publication Data

US 2016/0345174 A1    Nov. 24, 2016

Related U.S. Application Data

(63) Continuation of application No. 14/520,256, filed on Oct. 21, 2014, now Pat. No. 9,414,226, which is a
(Continued)

(51) Int. Cl.
| | |
|---|---|
| *H04W 12/06* | (2009.01) |
| *H04L 29/06* | (2006.01) |
| *H04L 9/00* | (2006.01) |
| *H04L 29/12* | (2006.01) |
| *G06F 21/12* | (2013.01) |
| *G06F 21/35* | (2013.01) |
| *G06F 21/33* | (2013.01) |

(Continued)

(52) U.S. Cl.
CPC ............ *H04W 12/06* (2013.01); *H04L 9/006* (2013.01); *H04L 61/1594* (2013.01); *H04L 63/0823* (2013.01); *G06F 21/12* (2013.01); *G06F 21/33* (2013.01); *G06F 21/35* (2013.01); *G06F 21/445* (2013.01); *H04L 2209/24* (2013.01); *H04W 12/04* (2013.01); *H04W 88/02* (2013.01)

(58) Field of Classification Search
CPC .......... G06F 21/35; G06F 21/12; G06F 21/33; G06F 21/445; H04L 63/0823; H04L 61/1594; H04L 9/006; H04L 12/06
See application file for complete search history.

(56) References Cited

U.S. PATENT DOCUMENTS

| | | |
|---|---|---|
| 6,262,608 B1 | 7/2001 | O'Hearcain et al. |
| 6,842,460 B1 | 1/2005 | Olkkonen et al. |

(Continued)

OTHER PUBLICATIONS

Telecommunication Sector of the Internationinal Telecommunications Union, Information Technology—Open Systems Interconnection—The Directory: Public-Key and Attribute Certificate Frameworks, ITU, ISO/IEC 9594-8, Mar. 31, 2000, Section 11.3, pp. 50-53, downloaded from http://www.itu.int/rec/T-REC-X.509-200003-S/en on Sep. 24, 2016.*

(Continued)

*Primary Examiner* — Carl G Colin
*Assistant Examiner* — Gary E Lavelle
(74) *Attorney, Agent, or Firm* — Greenberg Traurig, LLP

(57) ABSTRACT

Systems and methods of providing a secure access layer in a mobile phone and a computer system coupled to the mobile phone to provide authentication for transmitting data between the phone and the computer system.

18 Claims, 4 Drawing Sheets

Related U.S. Application Data continuation of application No. 11/759,212, filed on Jun. 6, 2007, now Pat. No. 8,918,905.

(60) Provisional application No. 60/811,583, filed on Jun. 6, 2006.

(51) Int. Cl.
*G06F 21/44* (2013.01)
*H04W 12/04* (2009.01)
*H04W 88/02* (2009.01)

(56) References Cited

U.S. PATENT DOCUMENTS

| | | | |
|---|---|---|---|
| 7,177,865 B2 | 2/2007 | Sasaki et al. | |
| 7,268,577 B2 | 9/2007 | Erickson et al. | |
| 7,380,125 B2 | 5/2008 | Di Luoffo et al. | |
| 7,441,121 B2* | 10/2008 | Cutter, Jr. | G06F 21/10 713/173 |
| 7,734,280 B2* | 6/2010 | Eastlake | H04L 63/08 380/247 |
| 8,918,905 B2 | 12/2014 | Chong | |
| 9,414,226 B2 | 8/2016 | Chong | |
| 2002/0087858 A1* | 7/2002 | Oliver | G06F 21/32 713/156 |
| 2003/0084169 A1* | 5/2003 | Zhu | H04L 29/06 709/229 |
| 2004/0009748 A1* | 1/2004 | Heinonen | H04W 8/005 455/41.2 |
| 2004/0229595 A1* | 11/2004 | Laursen | G06F 21/41 455/403 |
| 2005/0014531 A1 | 1/2005 | Findikli | |
| 2005/0025117 A1* | 2/2005 | Inagaki | H04L 45/02 370/350 |
| 2005/0071487 A1* | 3/2005 | Lu | H04L 67/16 709/230 |
| 2006/0021003 A1 | 1/2006 | Fisher et al. | |
| 2006/0265757 A1 | 11/2006 | Endoh | |
| 2007/0280480 A1 | 12/2007 | Chong | |
| 2008/0175211 A1* | 7/2008 | Hansen | H04W 12/02 370/338 |
| 2015/0045002 A1 | 2/2015 | Chong | |

OTHER PUBLICATIONS

Title: Method and System to Provide Secure Exchange of Data Between Mobile Phone and Computer System U.S. Appl. No. 11/759,212, filed Jun. 6, 2007,. Inventor(s): Benedict Chong Status: Notice of Allowance Mailed—Application Received in Office of Publication dated Aug. 13, 2014.

Title: Method and System to Provide Secure Exchange of Data Between Mobile Phone and Computer System U.S. Appl. No. 14/520,256, filed Oct. 21, 2014 Inventor(s): Benedict Chong U.S. Pat. No. 9,414,226 Issue Date: Aug. 9, 2016.

Telecommunication Sector of the Internationinal Telecommunications Union, Information Technology—Open Systems Interconnection6—The Directory: Public-Key and Attribute Certificate Frameworks, ITU, ISO/IEC 9594-8, Mar. 31, 2000, Section 11.3, pp. 50-53, downloaded from http://www.itu.int/rec/T-REC-X.509-200003-S/en on Apr. 18, 2015.

* cited by examiner

METHOD AND SYSTEM TO PROVIDE SECURE EXCHANGE OF DATA BETWEEN MOBILE PHONE AND COMPUTER SYSTEM

CROSS-REFERENCE TO RELATED APPLICATIONS

The present application is a continuation application of U.S. patent application Ser. No. 14/520,256, filed Oct. 21, 2014, issued as U.S. Pat. No. 9,414,226 on Aug. 9, 2016, and entitled "Method and System to Provide Secure Exchange of Data between Mobile Phone and Computer System", which is a continuation application of U.S. patent application Ser. No. 11/759,212, filed Jun. 6, 2007, issued as U.S. Pat. No. 8,918,905 on Dec. 23, 2014, and entitled "Method and System to Provide Secure Exchange of Data between Mobile Phone and Computer System", which claims the benefit of the filing date of U.S. Provisional Pat. App. Ser. No. 60/811,583, filed Jun. 6, 2006 and entitled "Secure Access Layer," the entire disclosures of which applications are hereby incorporated herein by reference.

BACKGROUND OF THE INVENTION

Mobile, or cellular phones can be electronically connected to PCs for the purpose of phonebook transfers, firmware update or transfers of content. However, when a mobile phone is electronically connected to a PC, it is vulnerable to unauthorized access by computer virus and other malicious programs.

FIG. 1 shows an example of the system and method 100 by which a mobile phone may connect to a PC as currently known in the art. Cellular phone 101, running operating system and applications 115, connects via line 121 (for example, a USB or serial line to a PC (everything above line 120 is located inside the PC, not shown) running phone access software instance 103, which accesses media content 104 and phonebook 105. However, this current approach shown in example 100 offers two ways in which a malicious program 106a or 106b can access phone 101. One way, used by rogue software 106a, is via the applications programming interface (API) 107 provided by the Dynamic Linked Library (DLL) 108. A DLL is a software library that provides phone-specific functions 109 used to access data on the connected mobile phone. Another way, used by rogue software 106b, is to access the phone via driver 110.

SUMMARY OF THE DESCRIPTION

Systems and methods of providing a secure access layer in a mobile phone and a computer system coupled to the mobile phone to provide authentication for transmitting data between the phone and the computer system, are described here. Some embodiments of the present disclosure are summarized in this section.

In one embodiment, the method, which may be implemented on a system, comprises a first secure access layer stored within a mobile telephone, coupled to a separate computer system, sending an authentication request to a second secure access layer stored within the separate computer system, to determine if the first secure access layer of the mobile telephone and the second secure access layer of the separate computer system, are matching, wherein the second secure access layer of the separate computer system is stored within a dynamic linked library comprising of executable program modules including phone-specific functions used to access data on the mobile phone connected to the computer system.

The first secure access layer within the mobile telephone confirming authenticity of the second secure access layer within the separate computer system by determining the first secure access layer of the mobile telephone and the second secure access layer of the separate computer are matching.

In response to the first secure access layer within the mobile telephone confirming authenticity of the second secure access layer within the separate computer system by determining the first secure access layer of the mobile telephone and the second secure access layer of the separate computer system are matching, the first secure access layer of the mobile telephone granting authorization to the dynamic linked library to transmit data between the mobile telephone and the separate computer system.

The present disclosure includes methods and apparatuses which perform these methods, including processing systems which perform these methods, and computer readable media which when executed on processing systems cause the systems to perform these methods.

Other features of the present disclosure will be apparent from the accompanying drawings and from the detailed description which follows.

BRIEF DESCRIPTION OF THE DRAWINGS

The embodiments are illustrated by way of example and not limitation in the figures of the accompanying drawings, in which like references indicate similar elements.

DETAILED DESCRIPTION OF THE EMBODIMENT

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present disclosure include systems and methods of providing a secure access layer in a mobile phone and a computer system coupled to the mobile phone to provide authentication for transmitting data between the phone and the computer system.

Figure 1:
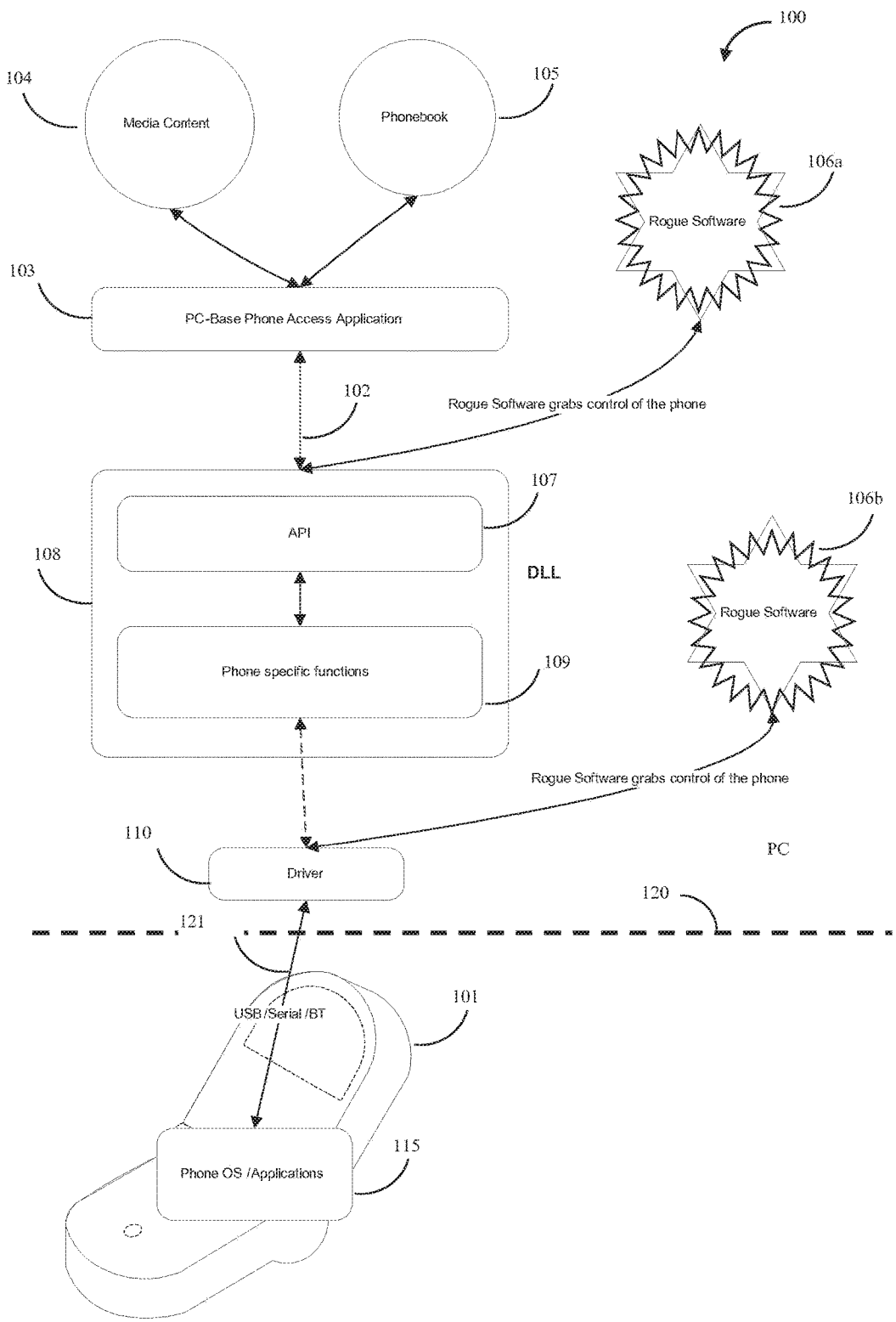
FIG. 1 shows an example of the system and method by which a mobile phone may connect to a PC as currently known in the art.
Figure 2:
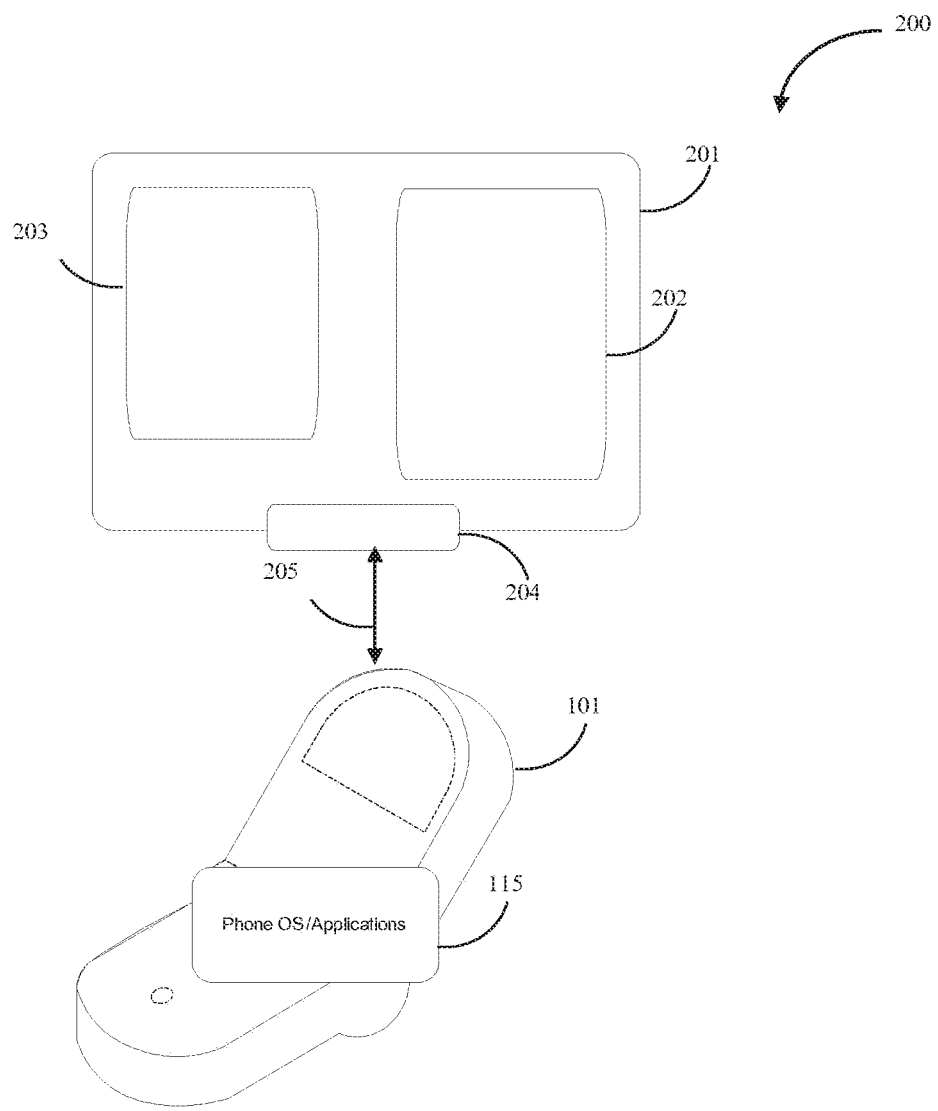
FIG. 2 shows an exemplary overview of a system for communication between a cellular phone and a PC.

FIG. 2 shows an exemplary overview of a system 200 for communication between a cellular phone 101 and a PC 201. PC 201 has a hard drive 202, which typically contains data and applications, an operating system, etc. Said PC is running software instance 203 that can communicate with and program a cellular phone, such as cellular phone 101, through universal serial bus (USB) port 204 via cable 205. It is clear that other means of communications may be used, including but not limited to USB connection, serial port connection, or custom and/or mixed connections, as well as wireless connections such as Bluetooth, WiFi, or over-the-air access, as offered by many carriers today.

Figure 3:
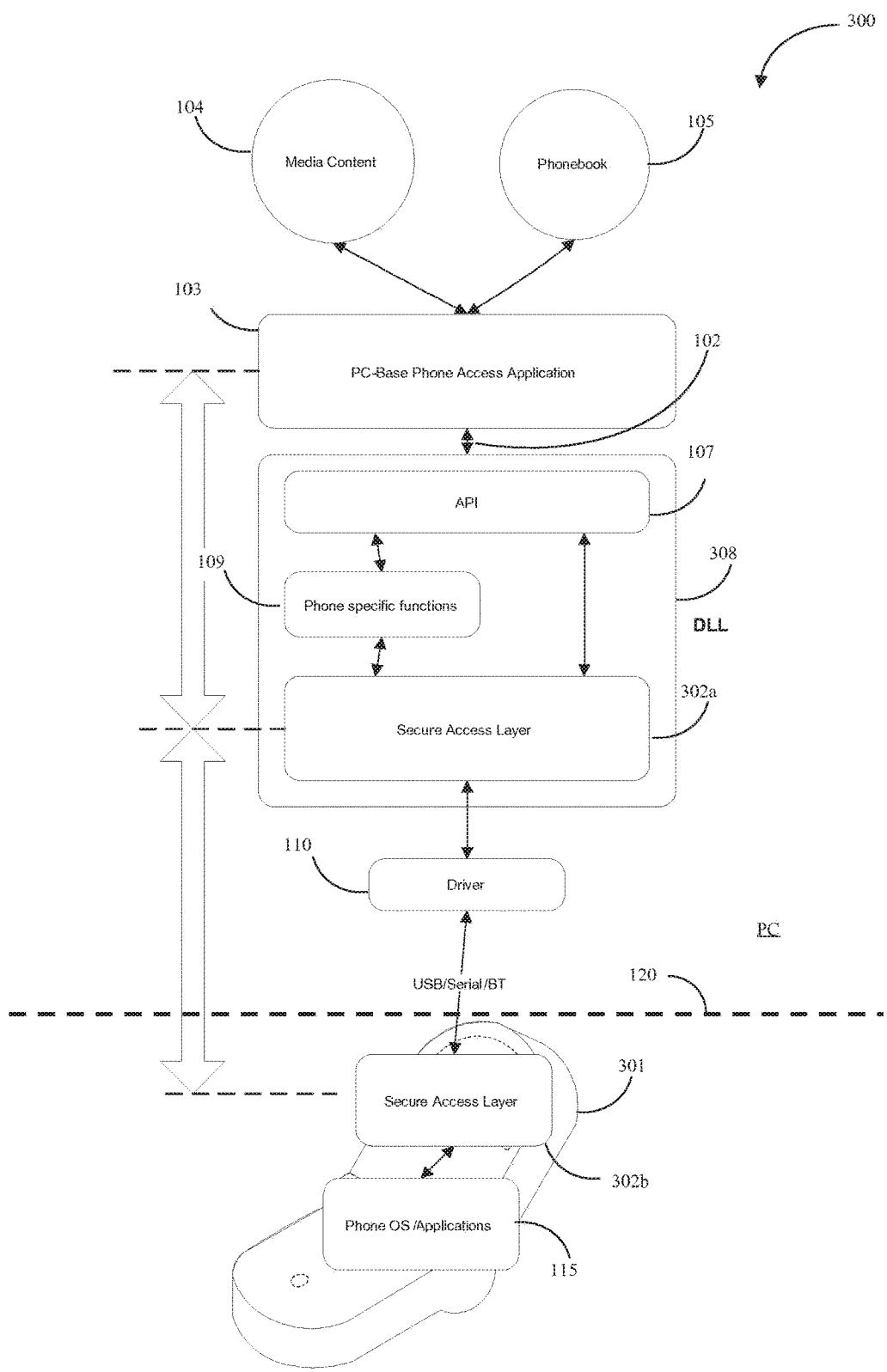
FIG. 3 shows a simplified example of the system and method by which a mobile phone may connect to a PC according to the novel art of this disclosure.

FIG. 3 shows a simplified example of the system and method 300 by which a mobile telephone 301 may connect to a PC, such as PC 201 (not shown) according to the novel art of this disclosure. Both the DLL 308 and the mobile telephone firmware contain a Secure Access Layer (SAL) 302a and 302b, respectively, which provide access authentication and authorization between the application 103, the DLL 308 and the mobile telephone 301. If a malicious program were to try to access the DLL 308 directly, bypassing the application 103, it fails the authentication process with the DLL 308. Similarly, if a malicious program were to try to access the telephone 301 directly using the device driver 110, it fails the authentication process with the telephone, because the telephone-side Secure Access software 302b communicates only with the DLL that has the matching Secure Access software 302a. This approach can also be used to secure data in the telephone from illicit access, because unauthenticated accesses are blocked by Secure Access software 302b before reaching, for example, telephone operating system and application(s) 115.

Figure 4:
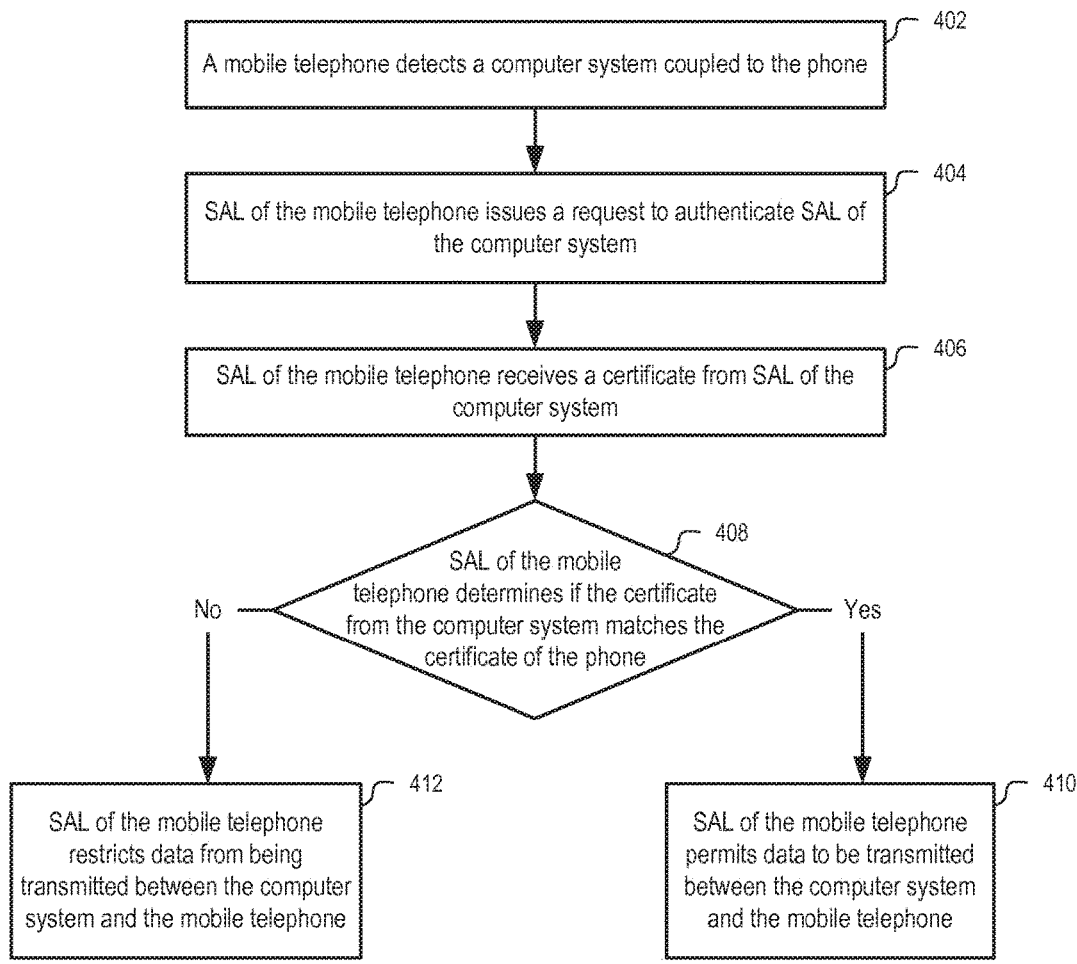
FIG. 4 presents a flow diagram describing the process, in accordance with one embodiment.

FIG. 4 presents a flow diagram describing the process of an SAL in a mobile telephone communicating with an SAL of a computer system to determine authenticity before receiving or sending data. In process 402, a communication monitor of the telephone (which can be part of the telephone operating system) detects that the telephone has been coupled to a computer system. In one embodiment, the "monitor" monitors any changes in any of the communication ports of the telephone. In response, in process 404 the SAL of the mobile telephone transmit a request to the computer system to determine if the computer system has a matching SAL. In one embodiment, the monitor's detection of a computer system being connected initiates the request of the SAL to be issued.

In one embodiment, the telephone SAL would request the computer SAL to identify itself. That would typically result in a certificate of authenticity exchange (e.g., a PKI certificate exchange), as described in more detail below. The communication protocol used to transmit the request from the SAL of the mobile telephone to the SAL of the computer system, may depend on the communication port of the mobile telephone. Each type of communication port comes with its own set of protocols, and typically one or more would be suitable to effect such an exchange.

In process 406, the mobile telephone receives the authentication data from the computer system. In one embodiment, the authentication data comprises a certificate of authenticity. In one embodiment, the certificate comprises Public Key Infrastructure (PKI) certificate. In alternative embodiments, other types of certificates may be used without departing from the scope of the present invention.

In one embodiment, the certificate is stored in the dynamic linked library and is accessed by the SAL and/or the driver 123 of the computer system, which responds to the request from the mobile telephone and provides the certificate to the requesting mobile telephone.

Upon receipt of the authentication data received from the computer system, in process 408, the SAL of the mobile telephone determines if the computer system is authorized to exchange data with the mobile telephone. In one embodiment, the SAL of the mobile telephone compares a certificate of authenticity in the SAL of the mobile telephone, with a certificate of authenticity received from the computer system to determine.

In process 410, if the SAL of the mobile telephone determines the certificates of authenticity are matching, the SAL permits the dynamic linked library to exchange data with the telephone operating system or applications on the mobile telephone. In one embodiment, the telephone specific functions of the dynamic linked library are used to exchange data between the operating system or applications of the mobile telephone, and a telephone access application of the computer system, which may provide access to data stored on the computer system, such as media content and phonebook data.

In process 412, if the SAL of the mobile telephone determines the certificates of authenticity are not matching, the SAL of the mobile telephone restricts the dynamic linked library from exchanging data with the telephone operating system or applications on the mobile phone. In one embodiment, if the SAL of the mobile telephone does not authenticate the SAL of the computer system, the SAL of the mobile telephone may present a false communication error with the telephone.

The machine-readable medium, as used herein, is an exemplary embodiment, and the term "machine-readable medium" as used herein includes a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
providing a mobile phone configured to communicate with a computer system, wherein an application installed on the mobile phone handles communication with the computer system, and a first certificate is stored in a dynamic linked library of the computer system, wherein the dynamic linked library contains a first secure access layer, wherein the dynamic linked library provides an application programming interface to a phone access application of the computer system, wherein the dynamic linked library further provides phone-specific functions used to access data on the mobile phone, and wherein access to the phone-specific functions requires authorization via the first secure access layer;
detecting, by the application installed on the mobile phone, that the mobile phone has been coupled to the computer system;
in response to the detecting, transmitting a request to the computer system to identify itself;
receiving, by the mobile phone in response to the request, the first certificate from the computer system;
determining, by a second secure access layer of the mobile phone, based on a comparison of the first certificate with a second certificate in the second secure access layer, whether the computer system is authorized to exchange data with the mobile phone;
enabling, based on an authorization granted by the second secure access layer, wireless communication by the mobile phone with the computer system; and
receiving data transmitted from the dynamic linked library of the computer system to the mobile phone, wherein the data is received via the enabled wireless communication.

2. The method of claim 1, further comprising displaying, on the mobile phone, a status regarding exchange of data with the computer system.

3. The method of claim 1, wherein the communication with the computer system is wireless communication via Bluetooth.

4. The method of claim 1, wherein the transmitted data comprises phonebook data.

5. The method of claim 1, wherein the first certificate from the computer system is provided by an application executing on the computer system.

6. The method of claim 1, wherein the application of the mobile phone is used to select media content for transmission from the computer system to the mobile phone.

7. A mobile phone, comprising:
a display;
a processor;
a connector to couple the mobile phone with a computer system, wherein the computer system stores a first certificate in a first secure access layer, wherein a dynamic linked library of the computer system contains the first secure access layer and provides an application programming interface to a phone access application of the computer system, wherein the dynamic linked library further provides phone-specific functions used to access data on the mobile phone, and wherein access to the phone-specific functions of the dynamic linked library requires authorization via the first secure access layer; and
memory storing a first application for execution by the processor, the first application configured to:
detect that the mobile phone has been coupled to the computer system;
in response to the detecting, transmit a request to the computer system to identify itself;
receive the first certificate from the computer system;
determine, by a second secure access layer of the mobile phone, based on a comparison of the first certificate with a second certificate in the second secure access layer, whether the computer system is authorized to exchange data with the mobile phone;
enable, based on an authorization granted by the second secure access layer, communication by the mobile phone with the computer system, wherein the second secure access layer is configured to communicate only with the first secure access layer; and
receive data transmitted from the computer system to the mobile phone via the first secure access layer, wherein the data is received via the enabled communication.

8. The mobile phone of claim 7, wherein the first application is further configured to enable wireless communication by the mobile phone with the computer system.

9. The mobile phone of claim 8, wherein the wireless communication is communication via Bluetooth.

10. The mobile phone of claim 7, wherein the first certificate from the computer system is provided by an application executing on the computer system.

11. The mobile phone of claim 7, wherein the first application is used to select media content for transmission from the computer system to the mobile phone.

12. The mobile phone of claim 7, wherein the first application is further configured to present, on the display, a status regarding exchange of data with the computer system.

13. The mobile phone of claim 7, wherein the communication with the computer system is through a universal serial bus (USB) port of the computer system via a cable that connects to the connector of the mobile phone.

14. A non-transitory machine-readable medium, having stored thereon a set of instructions, which when executed, cause a mobile phone to:
detect that the mobile phone has been coupled to a computer system, wherein a first certificate is stored in a first secure access layer of the computer system, wherein a dynamic linked library of the computer system contains the first secure access layer and provides an application programming interface to a phone access application of the computer system, wherein the dynamic linked library further provides phone-specific functions used to access data on the mobile phone, and wherein access to the phone-specific functions requires authorization via the first secure access layer;
in response to the detecting, transmit a request to the computer system;

receive, in response to the request, the first certificate from the computer system;

determine, based on a comparison of the first certificate with a second certificate in a second secure access layer of the mobile phone, whether the computer system is authorized to exchange data with the mobile phone;

enable, based on an authorization granted by the second secure access layer, communication by the mobile phone with the computer system; and receive data transmitted from the computer system to the mobile phone, wherein the data is received via the enabled communication.

15. The non-transitory machine-readable medium of claim 14, wherein the instructions further cause the mobile phone to display a status regarding exchange of data with the computer system.

16. The non-transitory machine-readable medium of claim 14, wherein the communication by the mobile phone with the computer system is wireless communication.

17. The non-transitory machine-readable medium of claim 14, wherein the communication with the computer system is through a universal serial bus (USB) port of the computer system via a cable that connects to the mobile phone.

18. The non-transitory machine-readable medium of claim 14, wherein the transmitted data comprises phonebook data.

* * * * *